Jan. 10, 1950  B. P. MIDDLESTETTER  2,493,989
SPRING MOTOR
Filed July 10, 1946  2 Sheets-Sheet 1

INVENTOR.
Brewster P. Middlestetter
BY Henry G. Dybvig
His Attorney

Jan. 10, 1950   B. P. MIDDLESTETTER   2,493,989
SPRING MOTOR
Filed July 10, 1946   2 Sheets-Sheet 2
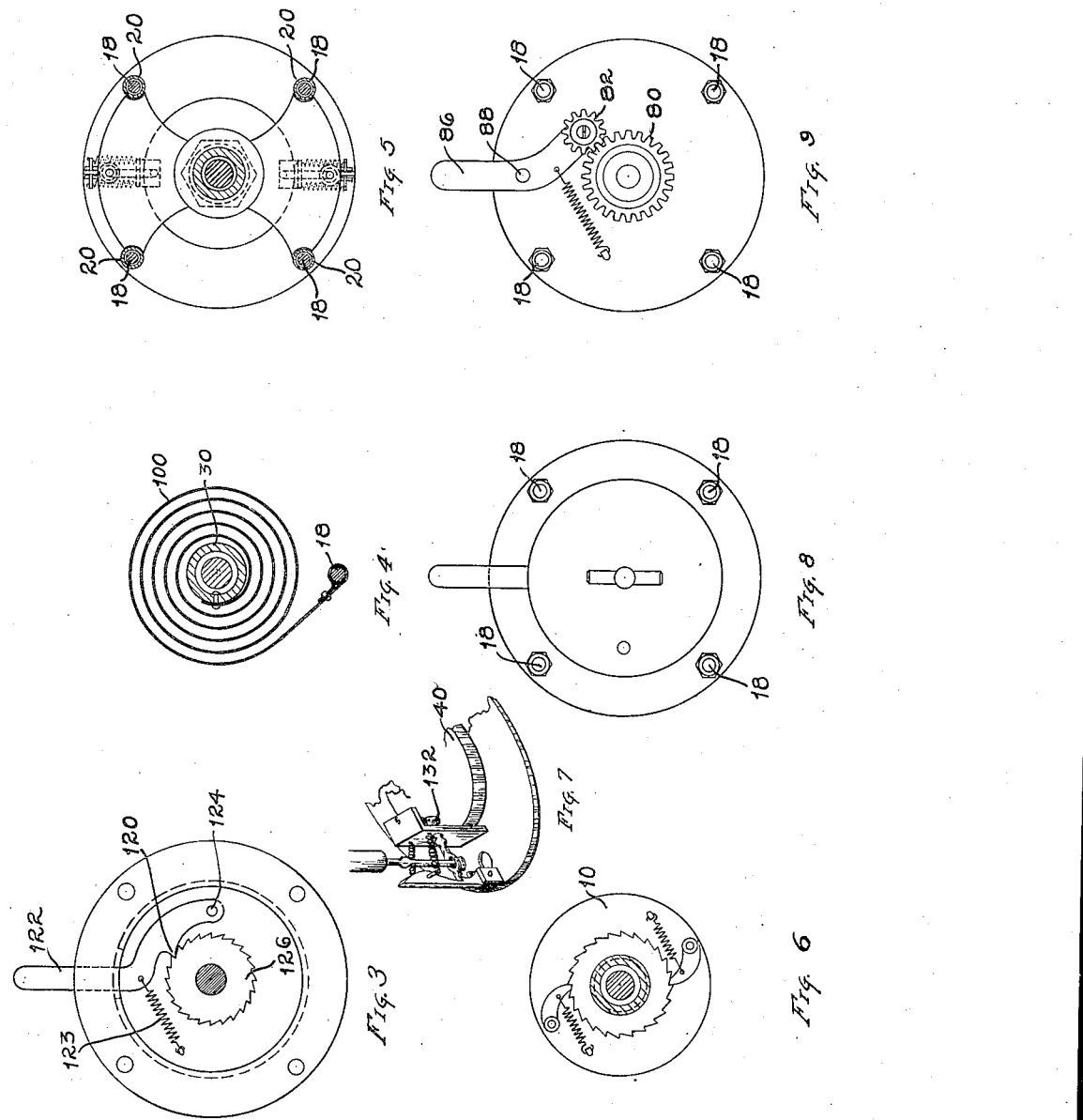
INVENTOR.
Brewster P. Middlestetter
BY Henry G. Dybvig
His Attorney Patented Jan. 10, 1950

2,493,989

UNITED STATES PATENT OFFICE 2,493,989

SPRING MOTOR

Brewster P. Middlestetter, near Lewisburg, Ohio

Application July 10, 1946, Serial No. 682,711

4 Claims. (Cl. 185—37)

This invention relates to a spring motor and more particularly to a spring motor utilizing a plurality of springs so constructed and arranged that the energy from only one spring is spent at a time.

Spring motors have been proposed for various usages. When a plurality of springs are to be used, if all of the springs are released simultaneously, a tremendous amount of force will be exerted for a short period of time. This is followed by a lean period when practically all of the energy from all of the springs has been spent, at which time the total output from each of the springs is quite low.

An object of this invention is to provide a plurality of springs, so arranged that each spring functions as a spring motor working independently of the other springs during the time that its energy is spent. When practically all of the energy has been spent, a succeeding spring motor is released, so as to permit this spring motor to spend its energy prior to the release of another spring motor, et cetera.

Another object of this invention is to provide a spring retaining and releasing mechanism that is satisfactory in holding the springs of succeeding motors until released, so as to permit the succeeding motor to be unwound to thereby supply its energy to the load.

Another object of this invention is to provide a spring motor mechanism wherein the load may be released so as to permit each one of the springs to rapidly release its energy in seriatim in readiness for the rewinding of the succeeding motors simultaneously.

Other objects and advantages reside in the construction of parts, the combination thereof and the mode of operation, as will become more apparent from the following description.

In the drawings, Figure 1 is a side elevational view of a spring motor.

Figure 3 is a cross sectional view taken substantially on the line 3—3 of Figure 1.

Figure 4 is a cross sectional view taken substantially on the line 4—4 of Figure 1.

Figure 5 is a cross sectional view taken substantially on the line 5—5 of Figure 1.

Figure 6 is a cross sectional view taken substantially on the line 6—6 of Figure 1.

Figure 7 is an enlarged, fragmentary, perspective view of the drive spring, brake and release mechanism.

Figure 8 is an end elevational view, as viewed from the right of Figure 1.

Figure 9 is an end view, as seen from the left of Figure 1.

Figure 1:
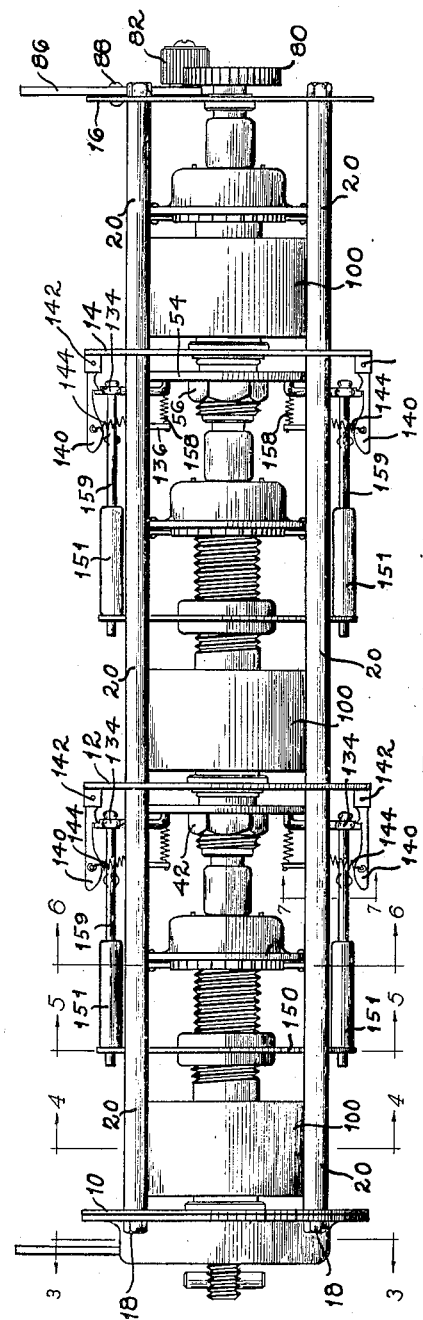

The frame assembly for supporting the spring motors includes a plurality of discs 10, 12, 14 and 16, held in equal spaced relation by four bolts 18 passing through suitable apertures in the discs 10, 12, 14 and 16, which discs are spaced apart by tubular members 20 positioned between the discs and around the bolts 18. The discs 10, 12 and 14 are provided with apertures for supporting the bearings 22, 24 and 26.

The bearing 22 has journalled therein a tubular shaft 30 provided with a threaded portion 32 and a reduced threaded portion 34. The bearing 24 has journalled therein a tubular shaft 36 provided with a threaded end 38 supporting a friction disc 40 held in position by a suitable nut 42. This tubular shaft 36 is also provided with threads 44 and a threaded reduced end 46. The bearing 26 supports a tubular shaft 50 provided with a threaded end 52 supporting a friction disc 54 held in position by a suitable nut 56. The opposite end of member 50 is provided with threads 58.

The tubular shafts 30, 36 and 50 each support a pair of bearings 60 and 62. These bearings support threaded shafts 64a, 64b and 64c, connected together by suitable coupling nuts 66. The disc 16 supports a bearing 68 having journalled therein the stubshaft 70 having both ends threaded. The shaft 64a and the shaft 70, by being coupled together with a coupling nut 66, rotate in unison, so that for all practical purposes these shafts are the full equivalent of one continuous shaft, as far as rotation is concerned.

The shaft 70 is provided with a threaded end threadedly engaging a gear 80 used in delivering the power through a pinion 82 in any selected load. The pinion 82 mounted upon a stubshaft 84 is fixedly attached to a lever 86, which lever is pivoted at 88 in such a manner that the pinion 82, cooperating with the gear 80, forms a clutch mechanism. By actuating the lever 86, it is possible to disengage the clutch, thereby releasing the load from the gear 80.

The shaft 70, driving the gear 80, is rotated from one of a plurality of spring motors. These spring motors are arranged in tandem, so that when the energy of one spring motor is spent, the succeeding spring motor is utilized in driving the shaft until all of the spring motors have had their energy spent. The spring motors, the clutch for connecting the several spring motors and the control mechanism for the spring motors will now be described.

Each spring motor includes a spring 100 having one end secured to one of the rods 18, as best seen in Figure 4, and the opposite end secured to the tubular shaft 30, or 36, or 50, as the case may be. The tubular shaft 30 has fixedly attached thereto a ratchet gear member 102 held in position by a suitable nut 104. A cup-shaped disc member 108 is secured to the shaft 64a through a nut member 110 having a pair of tongues 112 projecting through suitable apertures in member 108. The nut member 110 threadedly engages the threads on the end of the shift 64a. The disc member 108 supports pawl members 114, urged into engagement with the ratchet gear 102, so that the energy from the spring 100 is transmitted through the tubular shaft 30, which in turn rotates the ratchet gear 102, driving the disc member 108 through the pawl member 114 to drive the shaft 64a and thereby the shafts 64b, 64c and the shaft 70 and the gear 80. This will occur only when a pawl 120 integral with the starting lever 122 pivotally mounted at 124 to the disc 126 fixedly attached to the disc or frame member 10 is actuated out of engagement with the disc 126 threadedly engaging the exposed end of the shaft 64a. While the energy of the spring 100, fixedly attached to the shaft 30, is being spent, the tubular shafts 36 and 50 are held stationary by a friction brake mechanism, which will now be described.

In order to hold the succeeding springs, brake shoes 132 formed on the ends of bell crank levers 134, are pivotally mounted in brackets 136 integral with the disc-like supports or frame members 12 or 14, as the case may be, fixedly mounted upon the bolts or rods 18. The outer ends of the bell crank levers 134 are held in position by latches 140 pivoted at 142 and held in latching engagement by springs 144.

Figure 2:
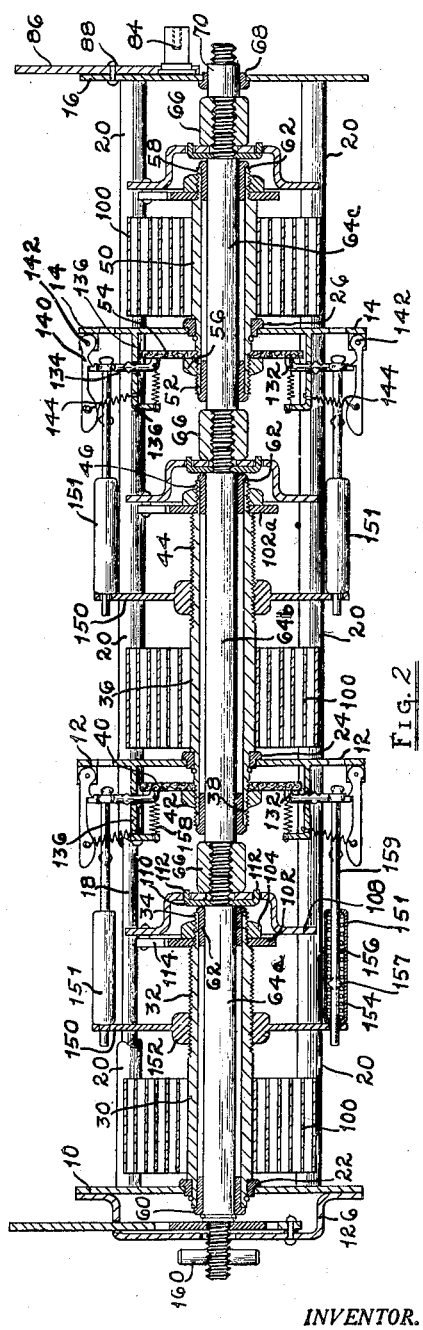
Figure 2 is a cross sectional view of the spring motor shown in Figure 1.

The brake shoe 132 is released by a release mechanism which includes a butterfly-like disc member 150 provided with a threaded nut portion 152 engaging the tubular shaft 30. As the tubular shaft 30 rotates, member 150 is actuated towards the right, thereby actuating the cylindrical members 151 fixedly attached thereto and housing a pair of compression springs 154 and 156. As the cylindrical members 151 advance to the right, as viewed in Figure 2, the cylindrical members 151 function as latch-lifting or latch-releasing members, in that members 151 are caused to engage the enlarged ends of the latches 140. As the latch is lifted, a spring 158 snaps the brake shoe 132 out of engagement with the disc 40, thereby releasing the succeeding spring.

As soon as the brake is released, the tubular shaft 36 will rotate a ratchet 102a, identical to 102, driving like parts to continue the rotation of the drive shaft. When the second spring begins to rotate the shaft 36, the disc member 150, threadedly engaging the tubular shaft 36, will begin to release the brake mechanism applied to the brake of the third spring motor, so as to release the third spring motor at the time the second spring motor has its energy spent. This operation will repeat itself until the energy of all of the spring motors has been spent.

When the spring motors have been unwound, these may be rewound by manually turning a key 160 on the end of the drive shaft assembly, so as to rewind all of the drive springs 100 in unison. As the spring motors are rewound, the rods 159, provided with extensions or enlargements 157 positioned between the springs 154 and 156 and passing through suitable apertures in the bell crank levers 134, finally engage the bell crank levers 134 so as to actuate these bell crank levers against the tension springs 158, to apply the brake shoes 132 and permit the latches 140 to engage the ends of the bell crank levers 134 to lock all but the first spring motor.

This arrangement of a spring motor may be used in actuating a generator for a flashlight, a lamp or it may be used in driving any other suitable load. If, for example, it is used in energizing a flashlight, it is merely necessary to release the pawl 120 from the ratchet 126 by actuating the lever 122 against the force of a spring 123 to start the motor. If, for example, some of the energy has been spent from the first spring, or for that matter any of the other succeeding springs, the flashlight may be turned off and the motor stopped, permitting the spring 123 to actuate the pawl 120 into engagement with the ratchet wheel 126, stopping the motor.

In the event it is found desirable to rewind the motor before spending all the energy of each spring, it is first necessary to permit all of the spring motors to become unwound. This may be accomplished by releasing the pinion 82 from the gear 80, so as to permit the gear 80 to spin while the spring motors are being unwound. Upon all of the spring motors being unwound, these may be wound by the winding key 160 that is normally exposed. The several spring motors are wound in unison, so that all of the spring motors will be equally wound.

A suitable shell or housing, not shown, may be used for enclosing the motor assembly.

Although the preferred embodiment of the device has been described, it will be understood that within the purview of this invention various changes may be made in the form, details, proportion and arrangement of parts; the combination thereof and mode of operation, which generally stated consist in a device capable of carrying out the objects set forth, as disclosed and defined in the appended claims.

Having thus described my invention, I claim:

1. A spring motor assembly including a plurality of spring motors arranged in tandem, a common drive shaft passing through the spring motors, each of the spring motors including a tubular member rotatably mounted on the drive shaft, a spring having one end fixedly mounted and the opposite end attached to the tubular member, said tubular member being provided with threads projecting beyond the spring, clutch mechanisms for connecting the spring motors to the drive shaft, there being one clutch mechanism for each spring motor, brake means for holding each succeeding motor, and means for releasing the brake means for one motor at a time, said releasing means including a threaded member actuated axially by the tubular member of the motor driving the shaft, said threaded member releasing the brake means of the next succeeding motor whenever the threaded member is actuated into a predetermined position.

2. A spring motor assembly including a plurality of spring motors arranged in tandem, a common drive shaft passing through the spring motors, each of the spring motors including a tubular member rotatably mounted on the drive shaft, a spring having one end fixedly mounted and the opposite end attached to the tubular member, said tubular member being provided with threads projecting beyond the spring, clutch mechanisms for connecting the spring motors to the drive shaft, there being one clutch mechanism for each spring motor, brake means including a friction disc fixedly attached to the tubular member of the succeeding motor, movable brake shoes, releasable means for holding the brake shoes in contact with the friction disc, and means including a threaded member threadedly engaging a tubular member of a preceding motor, so that as said tubular member rotates it actuates the threaded members axially to cause said means to actuate the releasable means to thereby release the brake shoes so as to cause the next succeeding motor to rotate the drive shaft.

3. A spring motor assembly including a plurality of spring motors arranged in tandem, a common drive shaft passing through the spring motors, each of the spring motors including a tubular member rotatably mounted on the drive shaft, a spring having one end fixedly mounted and the opposite end attached to the tubular member, said tubular member being provided with threads projecting beyond the spring, clutch mechanisms for connecting the spring motors to the drive shaft, there being one clutch mechanism for each spring motor, brake means for holding each succeeding motor, said brake means including a friction disc member attached to the tubular member of the succeeding motor, pivotally mounted brake shoe members mounted for oscillatory movement, yieldable means urging the brake shoe members out of engagement with the friction disc member, latch members for holding the brake shoe members in contact with the friction disc member in engagement with each other to prevent rotation of the succeeding motor, releasing means for releasing the latch members, said releasing means including a butterfly-like disc member threadedly engaging the tubular member of the preceding motor, and cylindrical members fixedly attached to the butterfly-like disc member, said cylindrical members advancing towards the latch members to release said latch members when the cylindrical members are actuated into a predetermined position to thereby permit the springs to snap the brake members out of engagement with the friction disc member to thereby release the succeeding motor.

4. A spring motor assembly including a plurality of spring motors arranged in tandem, a common drive shaft passing through the spring motors, each of the spring motors including a tubular member rotatably mounted on the drive shaft, a spring having one end fixedly mounted and the opposite end attached to the tubular member, said tubular member being provided with threads projecting beyond the spring, clutch mechanisms for connecting the spring motors to the drive shaft, there being one clutch mechanism for each spring motor, brake means for holding each succeeding motor, said brake means including a friction disc member attached to the tubular member of the succeeding motor, pivotally mounted brake shoe members mounted for oscillatory movement, yieldable means urging the brake shoe members out of engagement with the friction disc member, latch members for holding the brake shoe members in contact with the friction disc member in engagement with each other to prevent rotation of the succeeding motor, releasing means for releasing the latch members, said releasing means including a butterfly-like disc member threadedly engaging the tubular member of the preceding motor, cylindrical members fixedly attached to the butterfly-like disc member, said cylindrical members advancing towards the latch members to release said latch members when the cylindrical members are actuated into a predetermined position to thereby permit the springs to snap the brake members out of engagement with the friction disc member to thereby release the succeeding motor, and means for automatically resetting all of the brake shoe members upon the spring motors being rewound.

BREWSTER P. MIDDLESTETTER.

REFERENCES CITED

The following references are of record in the file of this patent:

UNITED STATES PATENTS

| Number | Name | Date |
| --- | --- | --- |
| 229,887 | Horton | July 13, 1880 |
| 300,753 | Austin | June 24, 1884 |
| 643,078 | Anderson | Feb. 6, 1900 |